United States Patent [19]

Buchler

[11] Patent Number: 4,673,788
[45] Date of Patent: Jun. 16, 1987

[54] STRAIGHTENING DEVICE FOR THE WIRE OF A WIRE ELECTROEROSION MACHINE

[75] Inventor: René Buchler, Sonnental, Switzerland

[73] Assignee: Büchler B-Set A.G., Flawil, Switzerland

[21] Appl. No.: 671,422

[22] Filed: Nov. 14, 1984

[30] Foreign Application Priority Data

Nov. 15, 1983 [CH] Switzerland ............... 6150/83

[51] Int. Cl.⁴ .................................. B23H 7/10
[52] U.S. Cl. ............................ 219/69 W; 204/206
[58] Field of Search ............. 219/69 E, 69 W, 137.61, 219/69 R; 204/206

[56] References Cited

U.S. PATENT DOCUMENTS

| 2,327,929 | 8/1943 | Quigley | 219/137.61 |
| 3,639,720 | 2/1972 | Malivoir | 219/137.61 |
| 3,730,136 | 5/1973 | Okada | 219/137.61 |
| 3,943,322 | 3/1976 | Lehmann et al. | 219/69 E |
| 3,981,786 | 9/1976 | Andrews | 219/69 E |
| 4,016,395 | 4/1977 | Rietveld | 219/69 W |
| 4,123,645 | 10/1978 | Shichida et al. | 219/69 W |
| 4,239,952 | 12/1980 | Rhyner | 219/69 W |
| 4,250,371 | 2/1981 | Haug et al. | 219/69 W |
| 4,414,458 | 11/1983 | Nomura | 219/69 W |
| 4,420,671 | 12/1983 | Bonga | 219/69 W |
| 4,485,288 | 11/1984 | Schneider | 219/69 E |

FOREIGN PATENT DOCUMENTS

| 104099 | 8/1979 | Japan | 219/69 W |
| 126025 | 7/1983 | Japan | 219/69 W |
| 474417 | 9/1975 | U.S.S.R. | 219/69 W |
| 488677 | 1/1976 | U.S.S.R. | 219/69 W |
| 904960 | 2/1982 | U.S.S.R. | 219/69 W |

Primary Examiner—A. D. Pellinen
Assistant Examiner—Geoffrey S. Evans
Attorney, Agent, or Firm—Wegner & Bretschneider

[57] ABSTRACT

A device for straightening the wire of a wire electroerosion machine includes a straightening block that is displaceably arranged on a beam and that can be fixed to the clamping table of a machine tool. The block has a through-opening, and a corner portion of the block is missing. In the vicinity of the side walls of the remainder of the block, an electrically contacting means is provided under each side wall. The longitudinal axes of the contacting means are at right angles to one another and are located in the same horizontal plane. The particular contacting means contains a bolt, which is located in a bore running roughly at right angles to the central bore in the block. At the end of the bolt located in the central bore is eccentrically provided a contact element having a cylindrical surface. The eroding wire can be brought into contact with the surface of the contact elements of the two contacting means. The device makes it possible to adjust the position of the eroding wire with a precision in the range of 2 to 3 thousandths mm.

9 Claims, 3 Drawing Figures

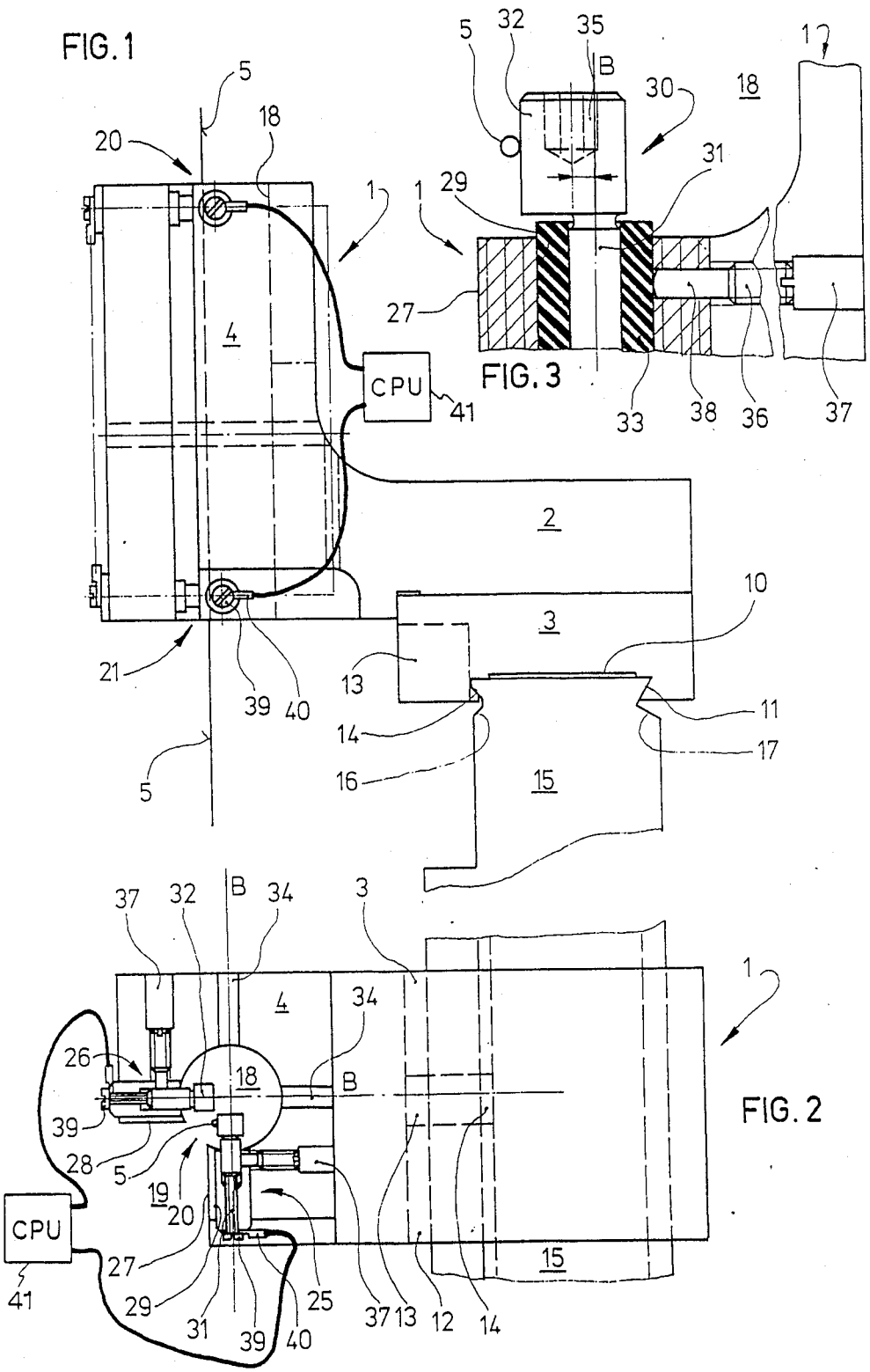

STRAIGHTENING DEVICE FOR THE WIRE OF A WIRE ELECTROEROSION MACHINE

BACKGROUND OF THE INVENTION

The present invention relates to a straightening device for the wire of a wire electroerosion machine with a block, to which is fitted at least one contact point for the wire and with contracting means for the wire located in the contact point.

In a known machine of this type, there are two contact points in the form of plates. One of these plates is located at the top of the block and the other is located at the bottom of the block. The plates are spaced by a distance of approximately 100 mm. The machine wire runs in a vertical direction, the wire guide being constructed in such a way that the upper and lower portions of the wire can be moved independently of one another in one plane to which the eroding wire is substantially at right angles. This arrangement makes it possible to vertically adjust the eroding wire, or to bring it into any desired sloping position.

If a cut is to be made in the workpiece at a specific angle, then the block is initially brought into a position such that the plane, in which the surface of the contact points is located, forms the desired angle with the perpendicular. Using a guide means for the wire, the latter is then moved until it is in contact with the contact points. When the wire contacts the particular contact point, the latter supplies a pulse to the central processing unit of the machine. If the machine central processing unit receives the pulse from the upper and lower contact points simultaneously, the central processing unit evaluates the pulse in such a way that the wire is parallel to or in the plane in which the surfaces of the contact points are also located. The wire has the desired slope and the machining operation can commence.

If the pulses are successively emitted by the contact points, then the central processing unit investigates which of the two pulses has arrived earlier than the other. There is then caused a corresponding displacement of the upper or lower wire portion and consequently a change in the wire slope. The wire is now moved once again up to the contact points and the synchronism of the pulses supplied by the contact points is again checked. This step is either followed by a further wire position correction process in the manner described hereinbefore, or it is indicated that the eroding wire has the desired position.

The contact point of the known device contains a plate having a substantially rectangular groove and the plate portion having this groove projects from the block. The machine wire can be inserted in the groove. The plate groove sides, which are at right angles to one another, are provided with contacting means that are insulated from the remainder of the plate which is made from metal. The contacting means are constituted by electrically conductive platelets, which are fitted in an insulated manner to the sides of the groove and whose free surface is vertical.

It was not possible, with a wire electroerosion machine constructed in this way, to adjust the wire position with a precision in the range of 2 to 3 thousandths mm. Thus, if the wire is brought up to the platelets, the edges of the latter decisively influence the time of supplying the pulse to the central processing unit. This influence is not a linear quantity, because a decisive part is played in this connection by any dirtying of the edge of the platelet or the like, apart from the slope of wire with respect to the platelets.

SUMMARY OF THE INVENTION

The problem of the present invention is to eliminate the aforementioned disadvantage of the known electroerosion machine.

The present invention is directed to a straightening device for the wire of a wire electroerosion machine wherein the device includes a block having a contact point for the wire fitted thereto, a contacting means for the wire located in the contact point and having an eccentrically adjustable contact element that has a nonplanar surface for contact with the wire.

BRIEF DESCRIPTION OF THE DRAWINGS

The invention is described in greater detail relative to non-limitative embodiments and the attached drawings, wherein:

FIG. 1 is a side view of that portion of the wire electroerosion machine having a block for aligning the wire-like machine tool;

FIG. 2 is a plan view of the machine portion shown in FIG. 1; and

FIG. 3 is a partial longitudinal section of one of the contacting means fitted to the block according to FIG. 1.

DETAILED DESCRIPTION OF THE PREFERRED EMBODIMENTS

The present straightening device for the wire of a wire electroerosion machine contains a block 1 made from an electrically conductive material and that is roughly L-shaped in vertical section. The horizontal leg 2 of block 1 is fixed to an intermediate piece 3, while the vertical leg 4 is constructed for cooperating with the eroding wire 5, which serves as the tool of the wire electroerosion machine. The drawing only shows a cutout from wire 5, the remaining parts thereof being guided in the usual way with such machines. The upper and lower end portions (not shown) of wire 5 are guided over rolls, which are movable in a plane at right angles to wire 5. As a result of the adjustment of the rolls in the plane of movement, eroding wire 5 can be brought into a vertical or some other sloping position.

The underside of intermediate piece 3 has a slot 10, one of whose lateral faces 11 is undercut. The opposite edge portion 12 of intermediate piece 3 has a recess, in which a holding piece 13 is removably fixed. Holding piece 13 can be held in the left-hand edge portion 12 by conventional holding means, e.g. with the aid of a screw, by magnetic force, or the like. The lower portion of holding piece 13 is provided with a projection 14, which projects into the interior of slot 10. The upper portion of a beam 15 is located in slot 10 and is directly or indirectly fixed to the machine table. The upper portion of beam 15 has facing grooves 16, 17, in which are located the undercut portion 11 of slot 10 and projection 14 of holding piece 13. As a result of this arrangement, intermediate piece 3 can be guided along beam 15.

Vertical leg 4 of block 1 has a vertically directed bore 18 roughly in the center thereof. A corner portion of block 4 is removed, so that it is possible to enter bore 18 with the guided wire 5. The open portion 19 of block 1 is shown at the bottom left of FIG. 2. At the top of block 1 is provided a first contact point 20 for wire 5. At the bottom of block 1 is provided a second contact point 21, which is constructed in the same way as the first-mentioned contact point 20. If one of the end portions of eroding wire 5 is immovable, then it is only necessary to have a single contact point 20 or 21. Thus, hereinafter only a single contact point will be described.

Contact point 20 contains two contacting means 25, 26, which are at right angles to one another and have an identical construction. As has already been stated, block 1 of the device has a removed portion 19. In the vicinity of walls 27, 28 freed in this way, horizontally directed bores 29 are arranged parallel thereto; see FIGS. 2 and 3. Each of these bores 29 contains a contact pin 30, which constitutes one of the components of contacting means 25 or 26.

Contact pin 30 comprises a bolt 31 and a contact element 32. Bolt 31 is located in a sleeve-like liner 33, which is pressed into bore 29. Liner 33 is made from an insulating material and contact pin 30 is mounted in a rotary manner in liner 33. If necesary, bolt 31 and the inside of liner 33 can be provided with a thread. Contact element 32 is fixed to the portion of bolt 31 projecting out of bore 29 and into the vertical central bore 18. In the represented embodiment, contact element 32 is externally cylindrical. The surface of contact element 32 could also be spherical. All that is important is that the surface of contact element 32 is planar and that consequently the contact element has no edges on the border of a planar surface.

Contact element 32 is eccentrically fitted to bolt 31, which is indicated in FIG. 3 by the position of axis B of bolt 31, which is simultaneously the axis of horizontal bore 29, as well as the axis of contact element 32. The machine wire 5 can be guided by the central processing unit of the machine until it engages with the surface of contact element 32. A further bore 34 is arranged in a coaxial manner with vertical bore 29 in the opposite wall of block 1 (FIG. 2). As can be seen from FIG. 3, contact element 32 has a cavity 35 that has a hexagonal cross-section. A hexagon wrench can be passed through the second vertical bore 34 into the cavity 35 in contact element 32.

With the aid of the hexagon wrench inserted in contact element 32, it is possible to rotate contact pin 30. As contact element 32 is eccentrically fitted to bolt 31, the point on the surface of contact element 32 on which the eroding wire 5 contacts the cylindrical surface of contact element 32, is removed to a greater or lesser extent from rotation axis B of bolt 31. As a result the position of the reference point for eroding wire 5 can be very accurately and also simply set.

After attaining the desired setting of contact element 32, the set position of contact pin 30 can be fixed with the aid of a screw 36. The latter can be a grup screw 36, which is screwed into a further horizontal opening 37. This opening 37 is also formed in FIG. 1 and runs at right angles to the first horizontal bore 29; see FIG. 2. The top 38 of fixing screw 36 is made from an insulating material, so that it comes to rest on the surface of bolt 31 made from a conductive material.

The outer end portion of bolt 31 is provided with a setscrew 39. Between the latter and the corresponding bearing face on bolt 31 is secured a conductor 40, which transmits the electrical pulse to the central processing unit 41, after eroding wire 5 has come into contact with contact element 32.

Since always only one of the lateral lines of the cylindrical surface of contact element 32 faces eroding wire 5 during any slope thereof and the lateral line is at right angles to the eroding wire 5, the time of contact of contact element 32 by wire 5 is substantially independent of the slope of said wire. Thus, the position of the eroding wire can be accurately adjusted with the aid of such a wire straightening device, the precision range being 2 to 3 thousandths mm.

As shown in FIG. 2, contact element 32 projects into the vertical central bore 18 in block 1. The second contacting means 26 is arranged under the other vertical wall 28 of block 1 at right angles to the first contacting means 25. During the straightening process, the guidance means for eroding wire 5 receives the instruction to guide said wire at right angles to the surface of contact element 32 of one of the two contacting means 25 or 26. Following any necessary correction of the position of eroding wire 5 in this direction, the guide means for wire 5 receives the instruction to guide the wire up to contact element 32 of the particular contacting means 26 or 25, which is at right angles to the first-mentioned contacting means. If necessary, then the position of eroding wire 5 is also corrected in this position. The eroding machine is then ready to machine workpieces.

If the guide of the lower portion of eroding wire 5 is immovable in a plane at right angles to the wire, then it is only necessary to have a single contact point 20 with the two contacting means 25, 26 at the top of block 1 at right angles to one another.

In order to be able to check, and if necessary adjust, the position on eroding wire 5 fixed in the machine head, the block 1 on beam 15 is displaced in such a way that wire 5 is roughly equidistant of contact elements 32 of the two contacting means 25, 26. Following the alignment of wire 5 in the described manner, the straightening device is then moved out of the area of the machine head with the aid of beam 15 and the intermediate piece 3 which is in engagement therewith.

What is claimed is:

1. A straightening device for aligning a cutting electrode of an electroerosion machine having rolls to guide the cutting electrode, said device comprising:

a block having a bore extending in a vertical direction, a least one end portion of said block being provided with a contact point for said cutting electrode whereby contact elements of said contact point are placed in said bore, each of said contact elements having a contact surface, each of said contact surfaces lying in a different plane, said block having a corner part thereof removed so that said cutting electrode can enter said bore and contact said contact elements of said contact point, and wherein said contact point is connected to a central processing unit of said electroerosion machine which controls the rolls.

wherein said contact point contains two contacting means that are at right angles to one another, first horizontally directed bores are arranged in the walls of said block whereby in said bores the respective contacting means is mounted in a rotary manner, each of said contacting means comprising a pin having a bolt and said contact element which is placed in said bore and fitted eccentrically to one end of said pin which is rotatably mounted in one of said horizontal bores.

2. The device of claim 1, wherein said contact element is externally cylindrical.

3. The device of claim 1, wherein said block is made from an electrically conductive material and wherein the interior of said bores is lined with an insulating material liner that surrounds said bolt of said contact pin.

4. The device of claim 1, wherein second horizontal openings are made in said block and form an angle of 90° with said bores and issues into the latter, said second horizontal openings containing contacting means, and wherein there is a screw for securing said contacting means placed in said second openings.

5. The device of claim 1, wherein said bolt is provided with a thread, and wherein the inner walls of said horizontal bores are provided with an insulating material having a corresponding thread.

6. The device of claim 1, wherein the outer portion of said bolt is provided with a screw, and between the screw and the corresponding bearing face of said bolt is secured a conductor that transmits the electrical pulse to the central processing unit of said electroerosion machine.

7. The device of claim 1, wherein said contact element is externally spherical.

8. A straightening device for aligning a cutting electrode of an electroerosion machine having rolls to guide the cutting electrode, said device comprising:

a block having a bore extending in a vertical direction, at least one end portion of said block being provided with a contact point for said cutting electrode whereby contact elements of said contact point are placed in said bore, each of said contact elements having a contact surface, each of said contact surfaces lying in a different plane, said block having a corner part thereof removed so that said cutting electrode can enter said bore and contact said contact elements of said contact point, and wherein said contact point is connected to a central processing unit of said electroerosion machine which controls the rolls, wherein each end portion of said bore is provided with one contact point and wherein said contact elements thereof are connected to the central processing unit controlling the roll adjacent to each respective contact point of said block.

9. A straightening device for aligning a cutting electrode of an electroerosion machine having rolls to guide the cutting electrode, said device comprising:

a block having a bore extending in a vertical direction, at least one end portion of said block being provided with a contact point for said cutting electrode whereby contact elements of said contact point are placed in said bore, each of said contact elements having a contact surface, each of said contact surfaces lying in a different plane, said block having a corner part thereof removed so that said cutting electrode can enter said bore and contact said contact elements of said contact point, and wherein said contact point is connected to a central processing unit of said electroerosion machine which controls the rolls, wherein a free end of each of said contact elements is provided with an internal hexagon and wherein the opposite wall of said block and coaxial to said internal hexagon is provided a bore, through which a hexagon wrench can be passed up to said contact element.

* * * * *